July 28, 1959 W. MÜLLER 2,897,384
SELF-STARTING SYNCHRONOUS MOTOR
Filed Dec. 5, 1956

United States Patent Office 2,897,384
Patented July 28, 1959

2,897,384

SELF-STARTING SYNCHRONOUS MOTOR

Willi Müller, Sonceboz, Switzerland, assignor to Société Industrielle de Sonceboz S.A. Horlogerie Industrielle et Appareils et Instruments électriques, Sonceboz, Switzerland Application December 5, 1956, Serial No. 626,402

Claims priority, application Switzerland December 15, 1955

4 Claims. (Cl. 310—163)

This invention relates to self-starting synchronous motors, more particularly to a novel and improved construction of an armature, free of windings for such motors.

In many electrical applications there are used apparatus which have to operate at a perfectly constant speed. This is the case, for example, in a great many applications in the science of time measurement, in which the motors are time bases, also in record-rotating mechanisms, such as sound-recording and sound-reproducing apparatus, and in many other devices of this type. It is important that the electric motors which control these apparatus, rotate at constant speeds.

Several solutions or methods are known for holding the speed of an electric motor constant, whether it is supplied with direct or alternating current. Most of these known methods, however, cannot be applied to small electric motors because of construction complications and of their space requirement, which is often excessive. On the other hand, the use of synchronous alternating-current motors which satisfactorily ensure a constant rotation, have the disadvantage of requiring auxiliary devices for starting the motor. These starting devices raise the initial costs and increase the space requirement of the motors. With a view to eliminating these auxiliary devices, a synchronous induction motor has been proposed which is fed by a two or three phase current and of which the armature reluctance is variable. In such a motor, the armature or rotor comprises a metallic cylinder provided with projections in form of salient poles. When starting the motor, the cylinder forms a short-circuited rotor and is rotated under the action of the rotating field generated by an inductor. When attaining synchronism, the rotor projections act like magnetic poles so that the rotor rotates with the speed of synchronism. Such a motor has several undesirable characteristics, such as requiring an inconveniently large air-gap, great increasing space requirements, and having a low power factor and a very low efficiency.

It is a principal object of the invention to provide a self-starting synchronous motor which eliminates the above-mentioned inconveniences and limitations. It is a feature of the motor in accordance with the invention that a single armature or rotor comprises a construction free of windings effecting the function of the usual two-circuit armature, comprising windings. The armature comprises at least one magnetic ring or portion made of a material in which the Foucault currents are substantially zero and at least one conductor ring or annular portion.

In preferred embodiments of the invention the rotor consists of a rotary support member or cylindrical core portion made of a light metal, for example, aluminum or of any other suitable material of sufficient mechanical strength such as a synthetic resin. The armature or rotor is provided with electrically conductive metallic rings and at least one magnetized ring of metal or magnetic plastic force fitted or pressed on the rotary support so as to rotate therewith. The metallic rings serve as means for starting the motor and bringing the motor up to substantially synchronous speed while the polarized or magnetized ring is used to make the motor "step into" synchronous speed and operate thereat.

Other objects, features and advantages of the invention will be understood from the following description and claims in conjunction with the accompanying drawings which illustrate by way of example preferred embodiments of the invention, and in which:

Fig. 2b is an end view of the rotor shown in Fig. 2a.

Fig. 4b is an end view of the rotor shown in Fig. 4a.

Fig. 5b is an end view of the rotor shown in Fig. 5a.

Fig. 6b is an end view of the rotor shown in Fig. 6a.

Figure 1:
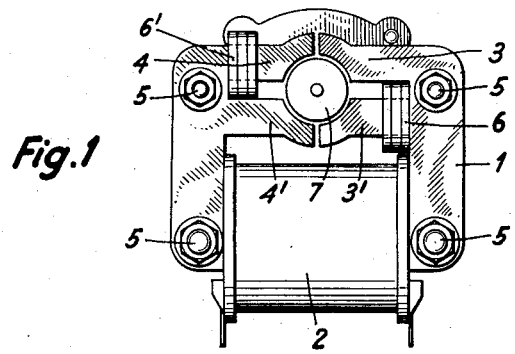
Fig. 1 is a side elevational view of the assembled motor in accordance with the invention.

The motor shown in Fig. 1 comprises a laminated C-shaped stator core 1 built up of thin magnetic sheet material or laminations held together in stacked relationship by a plurality of bolts 5. On the core 1 is mounted an inductor winding or coil 2 capable of being energized by single-phase current.

Stator core 1 is provided with two pairs of poles 3, 3' and 4, 4' respectively. The two shoes of each pair of poles are opposite each other, between which is rotatably mounted a rotor 7. On the opposite pole shoes belonging to two different poles, i.e., on the pole shoes 3' and 4 in Fig. 1, are mounted rings 6 and 6' respectively, which are made of a non-magnetic metal of good conductivity, for example copper or brass. This arrangement is known and permits generating a field rotating between the pole shoes of the stator core, thereby rotating rotor 7. The alternating magnetic flux generated in stator core 1 by coil 2, produces in the rings 6 and 6' induced currents which are displaced by 90° with respect to the magnetic inductor flux, so that two alternating magnetic fluxes displaced by 90°, in time and space, are obtained between the two opposite pole-shoe pairs 3, 3' and 4, 4'. These two magnetic fluxes thus produce a rotating field.

Rotor 7 which is described in detail later herein, is so constructed that it may function as a short-circuited rotor when the motor is started, and as a rotor of a synchronous motor when attaining synchronous speed.

Figure 2A:
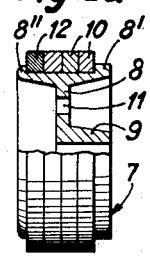
Fig. 2a is a side elevation view of the rotor of the motor in Fig. 1, partly broken away and partly in section.
Figure 2B:
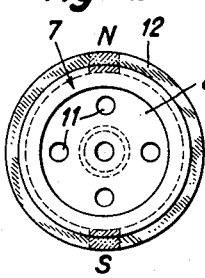

As shown in Figs. 2a and 2b, rotor 7 comprises a cylindrical support member or core portion 8 in the form of a pulley or drum-shaped member having a hub 9 for mounting on a shaft, not shown. Support member 8 is provided with lightening holes 11 to reduce the weight of the structure. The member 8 is preferably made of a non-magnetic light metal such as aluminum, but may also be made of other non-metallic materials such as a molded synthetic resin which has sufficient mechanical strength.

On the rotary support member 8 are provided, force-fitted, pressed or otherwise mounted thereon, three electrically conductive metallic rings (Fig. 2a) made, for example, of tempered steel in an abutting face-to-face relationship and bearing against a shoulder or rim 8' formed as a peripheral or circumferential flange on member 8. A permanent magnet comprising an annular member or ring 12 is also force-fitted, pressed or otherwise mounted on support member 8. In the manufacturing of the rotor the metallic and magnetic rings may be forced onto the member 8 and then the core 8 upset to form a peripheral or circumferential shoulder or bead 8" thereon, holding the assembled rings in fixed relationship relative one to the other and the rotary core member 8.

The three metallic rings 10 may be separated from each other by a thin coating of insulating lacquer, but in general the layer of oxide forming on the ring side-faces is sufficient to produce a satisfactory electrical insulation between the rings in order to eliminate or reduce the transient, stray, or otherwise parasitic currents in the rings.

Thus it can be seen that rotor 7 comprises two portions which, from an electrical point of view, function differently one from the other. The first portion comprises the metallic rings 10, and functions as a short-circuited rotor of an asynchronous motor. The other portion is formed by the permanent magnet 12, and functions as the rotor of a synchronous motor having alternate poles thereon. When starting the motor, the rotating field created by the inductor 2 rotates, in known manner, the metallic rings 10. As the speed of the rotor 7 increases, the reaction between the rings 10 and the rotating field decreases proportionately to the speed. Upon reaching synchronous speed the rings 10 are subjected to the action of the rotating field, and the permanent magnet 12 is rotated by the rotating field. The synchronous speed, i.e., the speed at which the permanent magnet enters into operation, depends solely on the supply-current frequency and on the number of pole-pairs on magnet 12. As for example, when the permanent magnet 12 has only one pair of poles (Fig. 1b) and when the supply-current frequency is 50 cycles, the synchronous speed is 3000 revolutions per minute. It is, however, obvious that magnet 12 may have a greater number of poles so that the synchronous speed may be accordingly reduced.

Figure 3A:
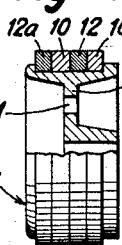
Figs. 3a, 3b, 3c are side elevation views of modifications of the rotor shown in Fig. 2a, partly broken away and partly in section.
Figure 3B:
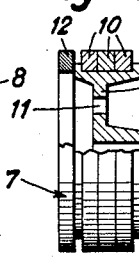
Figure 3C:
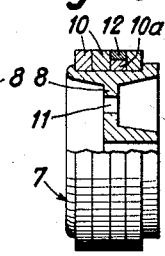

Figs. 3a, 3b and 3c show modifications of the rotor described. In the modification shown in Fig. 3a, rotor 7 comprises two permanent magnets 12 and 12a, annular in shape and being interposed between the metallic rings 10. The two ring magnets 12, 12a may be mounted so that their homologous poles are alined on the same rotor generatrix, or so that their homologous poles are staggered relatively to each other.

In the form shown in 3b, the permanent magnet 12 is fixed to the rim of support member 8 by a suitable adhesive means. In Fig. 3c, the permanent magnet 12 comprises a ring force-fitted to a metallic ring 10a having an outside diameter less than that of the metallic rings 10. The ring 10a is in turn force-fitted or otherwise secured on support member 8.

Figure 4A:
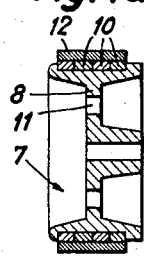
Fig. 4a is a sectional side view of a modification of the rotor of the motor shown in Fig. 1.
Figure 4B:
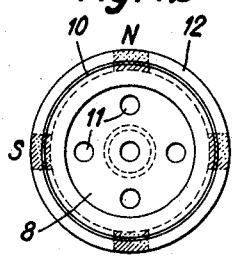

Referring to Figs. 4a and 4b wherein another embodiment of the rotor is shown, the permanent magnet 12 comprises a single ring fitting over and overlying all the metallic rings 10, as seen in Fig. 4b, the permanent magnet including two pairs of north and south poles.

Figure 5A:
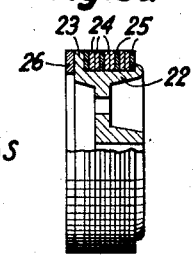
Fig. 5a is a side elevation view, partly broken away and partly in section, of a modification of the rotor of the motor shown in Fig. 1.
Figure 5B:
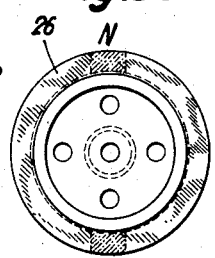

Referring to Figs. 5a and 5b, in which another rotor modification is shown and in which a support member 8 is provided with a peripheral portion 22 made of a non-magnetic material and having a rim 23, it will be noted that the rotor is provided with a stack of rings 24 made of soft-iron or non-magnetic material (electrical sheet, copper, aluminium) and alternating with hardened steel rings 25 and held by the rim 23 in spaced relationship with a magnetized ring 26. The ring 26 is secured to the end face of the member 8 by means of a metal adhesive or otherwise secured thereto. The magnet 26 and the rings 24 and 25 are thus magnetically spaced and separated by the non-magnetic rim 23.

Figure 6A:
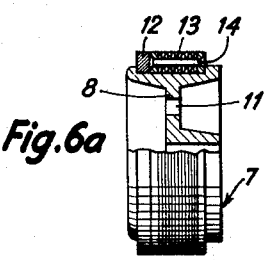
Fig. 6a is a side elevation view, partly broken away and partly in section of a modification of the rotor of the motor shown in Fig. 1.
Figure 6B:
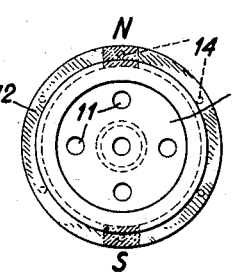

In the various forms of the invention described heretofore, the rotor portion which functions as a synchronous rotor, comprises abutting metallic rings which are separated from each other by a thin insulating layer of oxide or lacquer. In special cases where it is desired to improve the power factor of the motor the portion may be a squirrel-cage cuff made of a stack of thin electrical sheets or laminations. Such a form of the invention is shown in Figs. 6a and 6b. A stack 13 of magnetic sheets or laminations assembled by means of rivets 14 of copper or aluminum, and the entire assembly is pressed on or otherwise mounted on member 8. The permanent magnet ring 12 is assembled with the stack 13 in a manner heretofore discussed or by otherwise known methods. The ring may be provided with two poles, as shown, or a plurality of pairs of poles as mentioned heretofore.

In all of the examples, the magnetic rings are made or manufactured of a material having a narrow hysteresis curve or loop and in which the Foucault currents are practically zero, the rings are then permanently magnetized.

Although the foregoing examples refer to a self-starting synchronous motor fed by single-phase current, it will be understood that the same rotor could be used equally well for a polyphase synchronous motor.

While preferred embodiments of the invention have been illustrated and described, it will be understood that the invention is in no way limited to these embodiments and that many changes may be made within the spirit and scope of the invention as defined by the following claims.

What is claimed and desired to be secured by Letters Patent is:

1. In a self-starting synchronous motor, in combination with a Ferraris system stator, a compound rotor comprising, a rotatable single-piece cylindrical core portion of a non-magnetic material, a plurality of electrically conductive rings mounted circumferentially on said core portion forming an asynchronous rotor, said conductive rings comprising rings of non-magnetic material and of tempered steel disposed alternately on said core portion, at least one permanently magnetized ring of a material substantially free of eddy currents and low in hysteresis losses mounted on an end face of said core portion and coaxially with said first mentioned rings forming a synchronous rotor, and the core portion being provided with a bead and a flange each circumferentially disposed on opposite ends of said core portion cooperating to fix all of said rings on said core portion.

2. In a self-starting synchronous motor, in combination with a Ferraris system stator, a compound rotor comprising, a rotatable single-piece cylindrical core portion of a non-magnetic material, a plurality of electrically conductive rings mounted circumferentially on said core portion forming an asynchronous rotor, said conductive rings comprising rings of non-magnetic material and of tempered steel disposed alternately on said core portion, at least one permanently magnetized ring of a material substantially free of eddy currents and low in hysteresis losses mounted on an end face of said core portion coaxially with said first mentioned rings and axially spaced therefrom thereby forming a synchronous rotor, and the core portion being provided with means circumferentially disposed on opposite ends of said core portion cooperating to fix all of said rings on said core portion.

3. In a self-starting synchronous motor, in combination with a Ferraris system stator, a compound rotor comprising, a rotatable single-piece cylindrical core portion of a non-magnetic material, a plurality of electrically conductive rings mounted circumferentially on said core portion forming an asynchronous rotor, at least one permanently magnetized ring of a material substantially free of eddy currents and low in hysteresis losses mounted on an end face of said core portion and coaxially with said first mentioned rings thereby forming a synchronous rotor, and the core portion being provided with a bead and a flange each disposed circumferentially on said core portion cooperating to fix the conductive rings on the core portion.

4. In a self-starting synchronous motor, in combination with a Ferraris system stator, a compound rotor comprising, a rotatable single-piece cylindrical core portion of a non-magnetic material, a plurality of electrically conductive rings mounted circumferentially on said core portion forming an asynchronous rotor, at least one permanently magnetized ring of a material substantially free of eddy currents and low in hysteresis losses mounted on an end face of said core portion and coaxially with said first mentioned rings thereby forming a synchronous rotor, and the core portion being provided with means circumferentially disposed on opposite ends of said core portion cooperating to fix all of said rings on said core portion.

References Cited in the file of this patent

UNITED STATES PATENTS

| | | |
|---|---|---|
| 2,183,404 | Morrill | Dec. 12, 1939 |
| 2,444,164 | Kohlhagen | June 29, 1948 |
| 2,775,716 | Valeton et al. | Dec. 25, 1956 |

FOREIGN PATENTS

| | | |
|---|---|---|
| 373,537 | Great Britain | May 26, 1932 |
| 436,145 | Great Britain | Oct. 7, 1935 |